United States Patent [19]

Jacobs et al.

[11] Patent Number: 5,130,473

[45] Date of Patent: Jul. 14, 1992

[54] DITHIOCARBAMATE COMPOUNDS

[75] Inventors: Irwin C. Jacobs, Eureka; Neil E. S. Thompson, Creve Coeur, both of Mo.

[73] Assignee: Petrolite Corporation, St. Louis, Mo.

[21] Appl. No.: 638,268

[22] Filed: Jan. 7, 1991

Related U.S. Application Data

[60] Continuation-in-part of Ser. No. 581,856, Sep. 13, 1990, which is a division of Ser. No. 321,602, Mar. 10, 1989, abandoned, which is a continuation-in-part of Ser. No. 22,704, Mar. 6, 1987, abandoned, which is a continuation-in-part of Ser. No. 863,645, May 15, 1986, abandoned.

[51] Int. Cl.$^5$ .......................... C07C 303/00
[52] U.S. Cl. ........................................ 562/27
[58] Field of Search ............................ 562/27

[56] References Cited

U.S. PATENT DOCUMENTS

| | | | |
|---|---|---|---|
| 1,972,961 | 9/1934 | Tisdale et al. | 167/22 |
| 2,356,764 | 8/1944 | Kern | 260/2 |
| 2,563,007 | 8/1951 | Crouch | 260/247.1 |
| 2,733,262 | 1/1956 | Britton et al. | 260/500 |
| 2,791,605 | 5/1957 | Dorman et al. | 260/500 |
| 2,876,159 | 3/1959 | Sunderman et al. | 167/65 |
| 3,084,095 | 4/1963 | van den Boogaart | 167/22 |
| 3,179,511 | 4/1965 | Gray et al. | 71/2.7 |
| 3,248,400 | 4/1966 | Flieg et al. | 260/319 |
| 3,826,312 | 7/1974 | Richardson et al. | 166/307 |
| 4,068,720 | 1/1978 | Hessert et al. | 166/282 |
| 4,112,191 | 9/1978 | Anderson | 428/497 |
| 4,390,705 | 6/1983 | Gozzo et al. | 549/3 |

FOREIGN PATENT DOCUMENTS

| | | | |
|---|---|---|---|
| 0200143 | 12/1986 | European Pat. Off. | |
| 0249320 | 12/1987 | European Pat. Off. | 562/27 |
| 55-40640 | 3/1980 | Japan | 562/27 |
| 56-139452 | 10/1981 | Japan | 562/27 |
| 56-139453 | 10/1981 | Japan | 562/27 |
| 57-116045 | 7/1982 | Japan | 562/27 |
| 8910956 | 11/1989 | World Int. Prop. O. | 562/27 |

Primary Examiner—Bruce Gray
Attorney, Agent, or Firm—Stanley M. Tarter

[57] ABSTRACT

Reduction of asphaltene precipitation in asphaltenic subterranean reservoirs treated with aqueous solutions of strong acid is achieved by utilizing novel dithiocarbamate compositions to sequester iron.

2 Claims, No Drawings

DITHIOCARBAMATE COMPOUNDS

RELATED APPLICATIONS

This application is a continuation-in-part application of U.S. patent application Ser. No. 07/581,859, filed Sep. 13, 1990, which application is a divisional application of U.S. patent application Ser. No. 07/321,602, filed Mar. 10, 1989(now abandoned); which is a continuation-in-part application of U.S. patent application Ser. No. 07/022,704, filed Mar. 6, 1987 (now abandoned); which is a continuation-in-part application of U.S. patent application Ser. No. 06/863,645, filed May 15, 1986 (now abandoned).

BACKGROUND OF THE INVENTION

1. Field of the Invention

The present invention relates to acidizing processes for treatment of subterranean reservoir formations and, more particularly, relates to acidizing processes for treatment of asphaltenic reservoirs.

More particularly, the present invention relates to novel dithiocarbamate compositions which are particularly effective as aids in preventing asphaltene precipitation in asphaltenic reservoirs treated with a solution of a strong acid, and to methods of use of such novel compositions.

Asphaltenic crudes contain aromatic-based hydrocarbons of amorphous structure, generally referred to as asphaltenes. These asphaltenes are present in crude oil in the form of a colloidal dispersion which consists of an aggregate of high molecular weight polyaromatic molecules surrounded by lower molecular weight neutral resins in paraffinic hydrocarbons. This colloidal dispersion is stabilized by an absorbed layer which may be less aromatic and more paraffinic in nature. A negative surface charge has been postulated based on charge neutralization studies. Thus, highly charged positive species such as acid protons can have very dramatic impact on the surface charge by neutralizing it and allowing larger aggregates of these colloidal particles to form. The larger aggregates then tend to precipitate thereby forming sludges and/or rigid-film emulsions.

Various acid solutions have long been used to increase the permeability of a formation surrounding a well bore. In these treatments, the acid is normally pumped under pressure from the surface, through iron pipe and into the formation to dissolve various portions thereof. Such acid treatments have been particularly effective in calcareous formations and have been effective in increasing the production of oil, gas, brine or even water wells.

When these acid solutions are utilized to treat asphaltenic reservoirs, asphaltenic sludge and/or rigid-film emulsions develop and formation damage results in and around the well-bore area. As a consequence the well may be very slow to clean up or oil flow may be completely inhibited.

Anti-sludging agents, such as dodecylbenzenesulfonic acid, are typically used to control the formation of asphaltenic sludges caused by the addition of acid to asphaltenic reservoirs. Such anti-sludging agents are typically dispersed within the acid before treatment of the reservoir. However, such anti-sludging agents are significantly less effective in the presence of ferrous iron.

It is well documented that the use of acid solutions in reservoirs typically dissolves significant portions of ferric and ferrous iron from containers or conduits or components of subterranean reservoir formations. In addition, the acids utilized are typically contaminated with iron. Although asphaltenic sludges are more readily formed in the presence of ferric iron, relative to ferrous iron, tests have indicated that the ratio of ferrous to ferric iron ranges from between 5:1 to 10:1. The high levels of ferrous iron can be explained on the basis of a strong driving force for converting ferric iron to ferrous iron while the acid is being pumped because such acid is in contact with iron pipe. The net reaction is retarded by the presence of oxygen. The presence of such ferrous iron increases asphaltene precipitation and inhibits the effectiveness of anti-sludging agents.

Thus, although acidizing procedures are, in general, effective in increasing the production of oil by increasing the permeability of a formation surrounding the well bore, such procedures cause a variety of problems when used to treat asphaltenic reservoirs, many of which are due to the presence of ferrous iron.

Thus, by sequestering ferrous iron present in the acidic solutions to form iron complexes which are dispersible in highly acidic media and which are soluble in asphaltenic crudes, the effectiveness of the anti-sludging agents will be greatly increased thereby eliminating the problems associated with acidizing asphaltenic reservoirs. Furthermore, by reducing the ferric iron present in the system to ferrous iron, or by reducing the amount of oxygen in the system, the adverse effects of ferric iron can be simultaneously reduced or eliminated.

2. Prior Art

The most common iron sequestering agents in commercial practice are citric acid, ethylene diamine tetracetic acid (EDTA), nitrilo triacetic acid, acetic acid, lactic acid and citric acid/acetic acid mixtures. Other iron sequestering agents include ascorbic acid, erythorbic acid and salts thereof which are disclosed in U.S. Pat. No. 4,574,050 and which are utilized to prevent precipitation of ferric compounds from spent acid solutions. U.S. Pat. No. 4,096,914 discloses the use of salicylic acid to chelate the ferric ions that are dissolved within the acid and U.S. Pat. No. 4,137,972 discloses the use of sulfosalicylic acid for the same purpose. However, all of such iron sequestrants are only effective in acidic solutions wherein the pH is above about 2, and therefore are ineffective in acid solutions utilized in acidizing reservoirs wherein the acid solutions are typically from about 15% to 28% acid.

Thus, prior art efforts have not been directed at sequestering ferrous iron at very low pH to produce iron complexes which are dispersible in highly acidic media and which are soluble in asphaltenic crudes. Furthermore, such efforts have not been directed at preventing ferrous iron-asphaltene interaction to thereby permit anti-sludging agents to be effective.

SUMMARY OF THE INVENTION

The present invention is concerned with novel dithiocarbamate compositions useful as ferrous iron sequestrants in acidic solutions containing high percentages of acid, and with methods of use thereof as aids in reducing asphaltene precipitation in asphaltenic reservoirs treated with a solution of a strong acid.

DETAILED DESCRIPTION OF THE INVENTION

It has now been discovered that substantial improvements in iron sequestration in highly acidic media to produce iron complexes which are dispersible in such media and which are soluble in asphaltenic crudes can be achieved by utilizing dithiocarbamate compositions comprising at least one compound represented by the general formula:

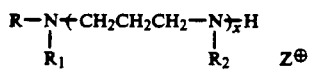

wherein:

R represents alkyl or alkenyl radicals having from about 8 to about 25 carbon atoms;

$R_1$ and $R_2$ independently represent $-C(=S)S^{\ominus}$ or

provided that at least one of $R_1$ or $R_2$ represents $-C(=S)S^{\ominus}$;

x represents an integer of 1 to 3; and $Z^{\oplus}$ represents a positively charge salt forming radical represented by the general formula:

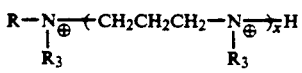

wherein:

$R_3$ represents

Stated another way, it has now been discovered that substantial improvements in iron sequestration in highly acidic media to produce iron complexes which are dispersible in such media and which are soluble in asphaltenic crudes can be achieved by utilizing at least one dithiocarbamate compound represented by the general formula:

wherein:

R represents alkyl, alkenyl, or alkadienyl radicals having from about 8 to about 25 carbon atoms;

n is an integer of 2 or 3;

x, y and z are independently zero or 1 with the proviso that the sum of x+y+z is 1, 2 or 3;

$N_1$, $N_2$, $N_3$ and $N_4$ are independently

NH, or $NH_2^+$ with the proviso that when

is not NH then at least one $N_2$, $N_3$ and $N_4$ must be

When the dithiocarbamate compounds have a net negative charge, the compounds are associated with at least one acceptable counterion, denoted herein as $Z^{\oplus}$, such as $R_1R_2R_3NH^+$ wherein $R_1$, $R_2$, and $R_3$ are hydrogen or $C_1$-$C_5$ alkyl.

Preferably, R represents alkyl and alkenyl radicals having from about 12 to about 22 carbon atoms, particularly from about 14 to about 22 carbon atoms.

Exemplary radicals represented by R include octyl, nonyl, decyl, dodecyl, tetradecyl, octadecyl, eicosyl, docosyl and pentacosyl, 1-octenyl, 1-decenyl, 1-dodecenyl, 1-octadecenyl, 9,12-octadecadienyl and the like and may be straight or branched chains.

Preferably, x represents an integer from about 1 to about 3, particularly 2 or 3, and most preferably 2.

In general terms, preparation of the compositions of the present invention can be represented by the following chemical reaction sequence involving essentially two steps: (1) the formation of a dithiocarbamic acid and (2) neutralization of the acid.

$$RNH_2 + CS_2 \rightarrow RNH\cdot CS\cdot SH \quad (1)$$

$$RNH\cdot CS\cdot SH + RNH_2 \rightarrow CS\cdot S^{\ominus} RN^{\oplus}H_3 \quad (2)$$

The reaction of the polyamine with carbon disulfide affords a mixture of compounds, illustrated as follows by the reaction of a an arlyldipropylenetriamine with $CS_2$:

$R-NHCH_2CH_2CH_2NHCH_2CH_2CH_2NH_2 + CS_2$

↓

+

(and isomers)

+

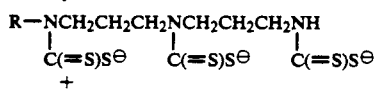
(and isomers)

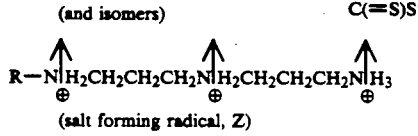

(salt forming radical, Z)

Because step (1) involves the transfer of hydrogen from an amine to sulfur, only primary and secondary amines having at least one hydrogen attached to a nitrogen can undergo this reaction.

Amines which find use in preparing the compositions of the invention include alkyl and alkenyl diamines, alkyl and alkenyl triamines and alkyl and alkenyl tetramines. The triamines and tetramines are preferred, especially the triamines.

The following non-limiting examples are for illustrative purposes only and represent the best mode for preparing the novel dithiocarbamate of the present invention.

EXAMPLE 1

Thirty grams (0.1 mole) of dodecyl triamine and 30 grams (0.3 mole) of triethylamine were dissolved in xylene, and 22.7 grams (0.3 mole) of carbon disulfide was slowly added to the solution over a period of five (5) minutes while maintaining the temperature of the mixture at about 35° C. The reaction mixture was subsequently heated to 60°–70° C. and maintained at that temperature for about one (1) hour.

EXAMPLE 2

Forty-six grams of tallow tetramine* (0.1 mole) were added to 148 grams xylene and 15 grams (0.2 mole) of carbon disulfide were added slowly while maintaining the temperature of the mixture below 50° C. The reaction mixture was stirred for one (1) hour.

*Tallow tetramine was analyzed and found to contain a mixture of alkyl and alkenyl radicals having from 14 to 22 carbon atoms, predominantly 18 carbon atoms.

EXAMPLE 3

Sixty-eight grams (0.2 mole) of a substituted diamine which, upon analysis, shows a mixture of alkyl and alkenyl substituent radicals having from 12 to 15 carbon atoms were added to 69 grams of xylene; 15.2 grams (0.2 mole) of carbon disulfide were added slowly according to the conditions set forth in Example 1. The mixture was stirred for about 30 minutes.

EXAMPLE 4

One hundred twelve grams (0.1 mole) of tallow triamine containing alkyl and alkenyl radicals with from 14 to 22 carbon atoms, predominantly 18 carbon atoms were added to 118 grams of xylene. Eleven and one-half grams (0.15 mole) of carbon disulfide were added slowly at about 35° C. The reaction mixture was heated to about 48° C. and stirred for 30 minutes.

Although these examples demonstrate preparation of the subject compositions utilizing substituted di-, tri- and tetramines having alkyl and alkenyl radicals with from 12 to 22 carbon atoms, it is contemplated that other di-, tri- and tetramines having alkyl and alkenyl radicals with from about 8 to about 25 carbon atoms, preferably from about 14 to about 22 carbon atoms, may also be utilized according to the procedure set forth in these examples.

USE AS AIDS, IN REDUCING ASPHALTENIC SLUDGE FORMATION

The novel dithiocarbamate compositions of the present invention are particularly useful as aids in reducing asphaltene precipitation in asphaltenic subterranean reservoirs treated with a solution of a strong acid.

Aqueous solutions of strong acids typically utilized in acidizing processes include hydrochloric acid and mixtures of hydrochloric acid with hydrofluoric acid. Such solutions generally include additives such as thickeners, corrosion inhibitors, wetting agents and the like. The acid content of such solutions can range from about 1% to about 30% by weight. Particularly suitable acids include aqueous hydrochloric acid containing from about 10% to 30% hydrochloric acid, preferably from about 15% to 28%, and aqueous acids containing from about 5% to 20% hydrochloric acid mixed with from about 1% to 5% hydrofluoric acid.

In the practice of utilizing the novel compositions of the present invention, such compositions are formulated with the treatment acid and many other additives at the surface and then injected into a well by conventional techniques. The present dithiocarbamate compositions are added to the acid in an amount sufficient to sequester a significant amount of ferrous iron.

Although anti-sludging agents may be introduced into the reservoir by any convenient means at any convenient point, it is preferred in the practice of utilizing the dithiocarbamates of the present invention to include an anti-sludging agent, such as either dodecylbenzenesulfonic acid or an alkyl pyridine, for example, ethyl pyridine, as an additive to the acid. It is generally, although not always, necessary to add an acid dispersant, such as an alkoxylated alkyl phenol, in order to present the anti-sludging agent from "oiling out" of the acid. Corrosion inhibitors and acid non-emulsifiers are also preferred additives and are well known in the art. Preferred corrosion inhibitors are those useful in highly acidic media. An exemplary acid corrosion inhibitor is one containing a mixture of quaternary ammonium compounds, acetylenic alcohols and oxyalkylated phenols in an aqueous alcohol solvent system. An exemplary acid non-emulsifier is one containing a mixture of fatty quaternary amines.

Since the present compositions are particularly effective in sequestering ferrous iron, it is also preferred to include a reagent effective as a reducing agent in highly acidic mediums, such as erythorbic acid, to reduce significant amounts of ferric iron to ferrous iron and/or to include an oxygen scavenger, such as ascorbic acid, to maintain appropriate conditions for the reaction which takes place while pumping the acid whereby ferric iron is reduced to ferrous iron. The addition of such reducing agent and/or such oxygen scavenger further reduces asphaltene precipitation and reduces iron interference with the activity of the anti-sludging agents, particularly in acidizing processes utilizing acid solutions containing greater than 20% acid.

In general, in a well treatment process, a major portion of the iron that becomes dissolved in an aqueous acid that is injected into a reservoir formation will be derived from contaminants in the acid or will be dissolved from rust and/or scale in the containers or conduits utilized in flowing the acid into the well site. Additional iron contamination is effected when succeeding portions of acid contact the conduits. Such additional contamination will generally be predominantly ferrous iron. Therefore, in the practice of acidizing a reservoir, it is preferable to utilize an acid having one or more of the subject dithiocarbamate compositions dispersed therein and to maintain, during the entire acidizing procedure, an amount of such compositions within the acid to effectively sequester significant portions of ferrous iron.

The following non-limiting examples are for illustrative purposes only and represent the best mode for utilizing the present compositions to reduce asphaltene precipitation.

A. Examples 5-9 simulate an acidizing procedure utilizing 15% hydrochloric acid

General Procedure

Fifty (50) ml of an asphaltenic crude was added to fifty (50) ml of 15% hydrochloric acid having 0.3% (by volume of HCl) of an acid non-emulsifier, 0.6% (by volume of HCl) of an acid corrosion inhibitor and the components listed in Table I uniformly dispersed therein. The mixture was shaken for 30 seconds and placed in a hot water bath at a temperature of 85° C. for 30 minutes. The hot mixture was poured through a 200 mesh wire screen and the sludge deposited thereon was washed with a small amount of isopropyl alcohol and air dried.

TABLE I

| Example # | Iron Concentration | % of 50% active Dodecylbenzenesulfonic Acid in a suitable solvent (by volume of HCl acid) | % Dithiocarbamate composition prepared according to procedure set forth in Example 4 (by volume of HCl acid) | Sludge Weight (in grams) |
| --- | --- | --- | --- | --- |
| 5 | 0 | 0 | 0 | 0.11 |
|   | 0 | 1 | 0 | 0 |
|   | 1000 ppm $Fe^{+2}$ | 0 | 0 | 0.47 |
|   | 1000 ppm $Fe^{+2}$ | 1 | 0 | 0.40 |
|   | 1000 ppm $Fe^{+2}$ | 1 | 1.0 | 0.01 |
| 6 | 750 ppm $Fe^{+2}$ 250 ppm $Fe^{+3}$ | 0 | 0 | 0.56 |
|   | 750 ppm $Fe^{+2}$ 250 ppm $Fe^{+3}$ | 1.5 | 0 | 0.52 |
|   | 750 ppm $Fe^{+2}$ 250 ppm $Fe^{+3}$ | 1.5 | 1.0 | 0 |
| 7 | 750 ppm $Fe^{+2}$ 250 ppm $Fe^{+3}$ | 0 | 0 | 0.65 |
|   | 750 ppm $Fe^{+2}$ 250 ppm $Fe^{+3}$ | 1.5 | 0 | 0.34 |
|   | 750 ppm $Fe^{+2}$ 250 ppm $Fe^{+3}$ | 1.5 | 1.0 | 0 |
| 8 | 750 ppm $Fe^{+2}$ 250 ppm $Fe^{+3}$ | 0 | 0 | 0.49 |
|   | 750 ppm $Fe^{+2}$ 250 ppm $Fe^{+3}$ | 1.5 | 0 | emulsion |
|   | 750 ppm $Fe^{+2}$ 250 ppm $Fe^{+3}$ | 1 | 1.0 | less than 0.01 |
| 9 | 750 ppm $Fe^{+2}$ 250 ppm $Fe^{+3}$ | 0 | 0 | 0.48 |
|   | 750 ppm $Fe^{+2}$ 250 ppm $Fe^{+3}$ | 1.5 | 0 | 0.46 |
|   | 750 ppm $Fe^{+2}$ 250 ppm $Fe^{+3}$ | 1.5 | 1.0 | 0 |

B. Examples 10-15 simulate an acidizing procedure utilizing 20% hydrochloric acid and show an increase in effectiveness with the addition of a reducing agent General Procedure Fifty (50) ml of an asphaltenic crude was added to fifty (50) ml of 20% hydrochloric acid having 0.8% (by volume of HCl) acid non-emulsifier, 750 ppm 0.3% (by volume of HCl) acid non-emulsifier, 750 ppm $Fe^{+2}$, 250 ppm $Fe^{+3}$ and the components listed in Table II uniformly dispersed therein. The sludge was determined as in Example A.

TABLE II

| Example # | % of 50% active Dodecylbenzenesulfonic Acid in a suitable solvent (by volume of HCl acid) | % Dithiocarbamate composition prepared according to procedure set forth in Example 4 (by volume of HCl acid) | Amount of Erythorbic Acid (mg) (as reducing agent or oxygen scavenger) | Sludge Weight (in grams) |
| --- | --- | --- | --- | --- |
| 10 | 2 | 1.0 | 0 | 0.21 |
| 11 | 2.5 | 1.0 | 0 | 0.14 |
| 12 | 3.0 | 1.0 | 0 | 0.10 |
| 13 | 2.0 | 1.0 | 30 | 0.10 |
| 14 | 2.5 | 1.0 | 30 | 0 |
| 15 | 3.0 | 1.0 | 30 | 0 |

All of Example 5-15 utilize a dithiocarbamate composition prepared according to the procedure set forth in Example 4. The dithiocarbamate compositions of Examples 1 and 2 also show activity in reducing asphaltenic sludge under conditions similar to those set forth in Examples 5-15. Furthermore, it is contemplated that di-, tri- and tetramines having alkyl and alkenyl radicals with from about 8 to about 25 carbon atoms will also show activity in reducing asphaltenic sludge under similar conditions.

It is contemplated that additional uses of the present compositions will include use thereof as corrosion inhibitors.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present inven-

What is claimed is:

1. A compound represented by the formula:

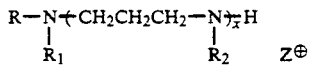
$$R-N(CH_2CH_2CH_2-N)_xH \quad Z^{\oplus}$$
with $R_1$, $R_2$ wherein R represents alkyl or alkenyl radicals having from about 8 to about 25 carbon atoms; $R_1$ and $R_2$ independently represent $-C(=S)S^{\ominus}$ or

provided that at least one of $R_1$ or $R_2$ represents $-C(=S)S^{\ominus}$; x represents an integer of 1 to 3; and $Z^{\oplus}$ represents a positively charged salt forming radical represented by the general formula:

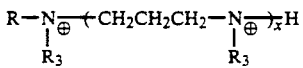

wherein $R_3$ represents

2. The compound of claim 1 wherein R is a mixture of alkyl and alkenyl radicals having from about 14 to about 22 carbon atoms.